United States Patent
Franz et al.

(10) Patent No.: US 6,574,121 B1
(45) Date of Patent: Jun. 3, 2003

(54) HOUSING GROUND BRACKET AND METHOD

(75) Inventors: Perry D. Franz, Elk Mound, WI (US); Jeffrey Mark Glanzman, Mondovi, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/548,497

(22) Filed: Apr. 13, 2000

Related U.S. Application Data

(63) Continuation-in-part of application No. 09/408,148, filed on Sep. 29, 1999.

(51) Int. Cl.[7] .................................................. H02B 1/01
(52) U.S. Cl. ......................................... 361/825; 361/799
(58) Field of Search ................................ 361/724–727, 361/683, 679, 799, 807, 825–827; 174/151, 154; 312/223.1–223.3

(56) References Cited

U.S. PATENT DOCUMENTS

| | | | |
|---|---|---|---|
| 2,531,110 A | 11/1950 | Cisler .......................... 174/52 |
| 3,657,608 A | 4/1972 | Leone et al. ................. 317/118 |
| 3,677,615 A | 7/1972 | Hudson ....................... 312/346 |
| 4,204,248 A | * 5/1980 | Proffit et al. ............... 174/16.3 |
| 4,442,476 A | 4/1984 | Lenderking et al. ........ 361/395 |
| 4,535,703 A | 8/1985 | Henriott et al. ............... 108/50 |
| 4,892,489 A | 1/1990 | Hirai .......................... 439/497 |
| 5,027,257 A | 6/1991 | Lockwood et al. ......... 361/428 |
| 5,049,701 A | 9/1991 | Vowles et al. ............ 174/35 R |
| 5,142,442 A | 8/1992 | Daniels et al. .............. 361/384 |
| 5,154,126 A | 10/1992 | Newhouse et al. ........... 108/50 |
| 5,165,770 A | 11/1992 | Hahn ....................... 312/265.4 |
| 5,209,356 A | 5/1993 | Chaffee ........................ 211/26 |
| 5,238,418 A | 8/1993 | Koiner ........................ 439/157 |
| 5,275,494 A | 1/1994 | Petracca et al. .............. 400/83 |
| 5,277,131 A | 1/1994 | Fortsch ......................... 108/50 |
| 5,291,368 A | 3/1994 | Conroy-Wass .............. 361/796 |
| 5,331,508 A | 7/1994 | Hosoi et al. ................. 361/680 |
| 5,339,221 A | 8/1994 | Conroy-Wass et al. ..... 361/796 |
| 5,355,278 A | 10/1994 | Hosoi et al. ................. 361/680 |
| 5,385,870 A | 1/1995 | Maue et al. ................. 439/157 |

(List continued on next page.)

Primary Examiner—David Martin
Assistant Examiner—Thanh S. Phan
(74) Attorney, Agent, or Firm—Schwegman, Lundberg, Woessner & Kluth, P.A.

(57) ABSTRACT

A ground bracket and method for grounding an electronic device to a structure such as a rail, rack or cabinet. According to one aspect of the invention the ground bracket has a first conductive surface for use in coupling the bracket to the structure and an arcuate portion conductively coupled to the first conductive surface for contacting an electronic device. In another embodiment, a bracket includes a first surface for coupling to a rack, and a portion positioned proximal a computer component that includes a rotatable fastening mechanism for coupling to the computer component.

40 Claims, 6 Drawing Sheets

U.S. PATENT DOCUMENTS

| | | | | |
|---|---|---|---|---|
| 5,475,570 A | * | 12/1995 | Harr | 337/174 |
| 5,559,922 A | | 9/1996 | Arnett | 385/135 |
| 5,568,362 A | | 10/1996 | Hansson | 361/736 |
| 5,571,256 A | | 11/1996 | Good et al. | 211/26 |
| 5,574,251 A | | 11/1996 | Sevier | 174/50 |
| 5,586,003 A | | 12/1996 | Schmitt et al. | 361/683 |
| 5,586,012 A | | 12/1996 | Lerman | 361/826 |
| 5,611,708 A | | 3/1997 | Mizunuma et al. | 439/358 |
| 5,618,091 A | | 4/1997 | Huber et al. | 312/348.1 |
| 5,654,873 A | | 8/1997 | Smithson et al. | 361/685 |
| 5,666,271 A | | 9/1997 | Kim et al. | 361/726 |
| 5,673,632 A | | 10/1997 | Sykes | 108/121 |
| 5,690,403 A | | 11/1997 | Ellison et al. | 312/223.6 |
| 5,724,469 A | | 3/1998 | Orlando | 385/135 |
| 5,761,033 A | | 6/1998 | Wilhelm | 361/686 |
| 5,788,087 A | | 8/1998 | Orlando | 211/26 |
| 5,803,770 A | | 9/1998 | Swendson et al. | 439/676 |
| 5,823,650 A | | 10/1998 | Lin | 312/348.1 |
| 5,896,273 A | | 4/1999 | Varghese et al. | 361/724 |
| 5,975,735 A | | 11/1999 | Schmitt | 364/131 |
| 6,009,224 A | | 12/1999 | Allen | 385/135 |
| 6,016,252 A | | 1/2000 | Pignolet et al. | 361/724 |
| 6,021,909 A | | 2/2000 | Tang et al. | 211/183 |
| 6,080,930 A | * | 6/2000 | Lommen et al. | 174/35 GC |
| 6,081,644 A | | 6/2000 | Stateczny et al. | 385/135 |
| 6,088,222 A | | 7/2000 | Schmitt et al. | 361/686 |
| 6,095,345 A | | 8/2000 | Gibbons | 211/26 |
| 6,129,429 A | | 10/2000 | Hardt et al. | 312/223.2 |
| 6,259,605 B1 | | 7/2001 | Schmitt | 361/727 |
| 6,279,754 B1 | | 8/2001 | Hoss et al. | 211/26 |
| 6,123,203 A1 | | 9/2001 | Gibbons | 211/26 |
| 6,320,120 B1 | * | 11/2001 | Van Haaster | 174/17 CT |
| 6,324,065 B1 | * | 11/2001 | Nelson et al. | 211/41.17 |
| 6,360,422 B1 | * | 3/2002 | Kam | 29/525.11 |
| 6,452,805 B1 | * | 9/2002 | Franz et al. | 361/724 |

* cited by examiner

HOUSING GROUND BRACKET AND METHOD

This application is a Continuation-in-part application of U.S. application Ser. No. 09/408,148 filed Sep. 29, 1999, the specification of which is herein incorporated by reference.

FIELD OF THE INVENTION

This invention relates to electronic hardware, and in particular to a ground bracket and method for aligning and grounding a housing of an electronic device to a structure.

BACKGROUND

Commercial use electronic systems typically include electronic devices resting on a special sub-floor allowing for cable routing and grounding beneath the floor surface. In some cases, electronic devices are placed in structures resting on the sub-floor.

Service and upgrade of electronic systems also typically requires removal of a eletronic device from the rack after disconnection of cables. Service and upgrade also may require disassembly of the electronic device housing to access, repair or replace components internal to the device before the device is replaced within a structure. Installation, service and upgrade of a electronic systems can be a protracted and cumbersome process further complicated by the need to detach and reattach the ground connection to a sub-floor ground grid.

Another problem is the lack of alignment common to these electronic devices. Electronic devices formed from these discrete units must be assembled together to make a larger system. Devices are typically difficult to align and install into the structure. The position of the device must typically be adjusted into the proper position and must be adjusted in order to be secured within the structure. Accessing portions of the electronic system typically requires accessing a number of discrete devices. Devices will typically be positioned within structure providing poor access to the device. This can slow the installation, service, and upgrade processes making larger systems from these components less desirable. This is also one cause of poor field serviceability. Proper positioning, grounding and servicing of devices is often either not done, poorly done, or is improperly done.

A need exists for improving the ease with which electronic devices are aligned and grounded.

DISCLOSURE OF INVENTION

The present invention provides ground bracket and method for aligning and grounding an electronic device to a structure such as a rail, a rack or a cabinet.

According to one aspect of the invention a ground bracket provides an electrical path from an electronic device to a structure. The ground bracket has a first conductive surface for use in coupling the bracket to the structure and an arcuate portion conductively coupled to the first conductive surface.

In another embodiment, a bracket includes a first surface for coupling to a rack, and a portion positioned proximal a computer component that includes a rotatable fastening mechanism for coupling to the computer component.

The resulting ground bracket and method improves the ease with which an electronic device is aligned and grounded to a structure.

DESCRIPTION OF EMBODIMENTS

In the following detailed description of the preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
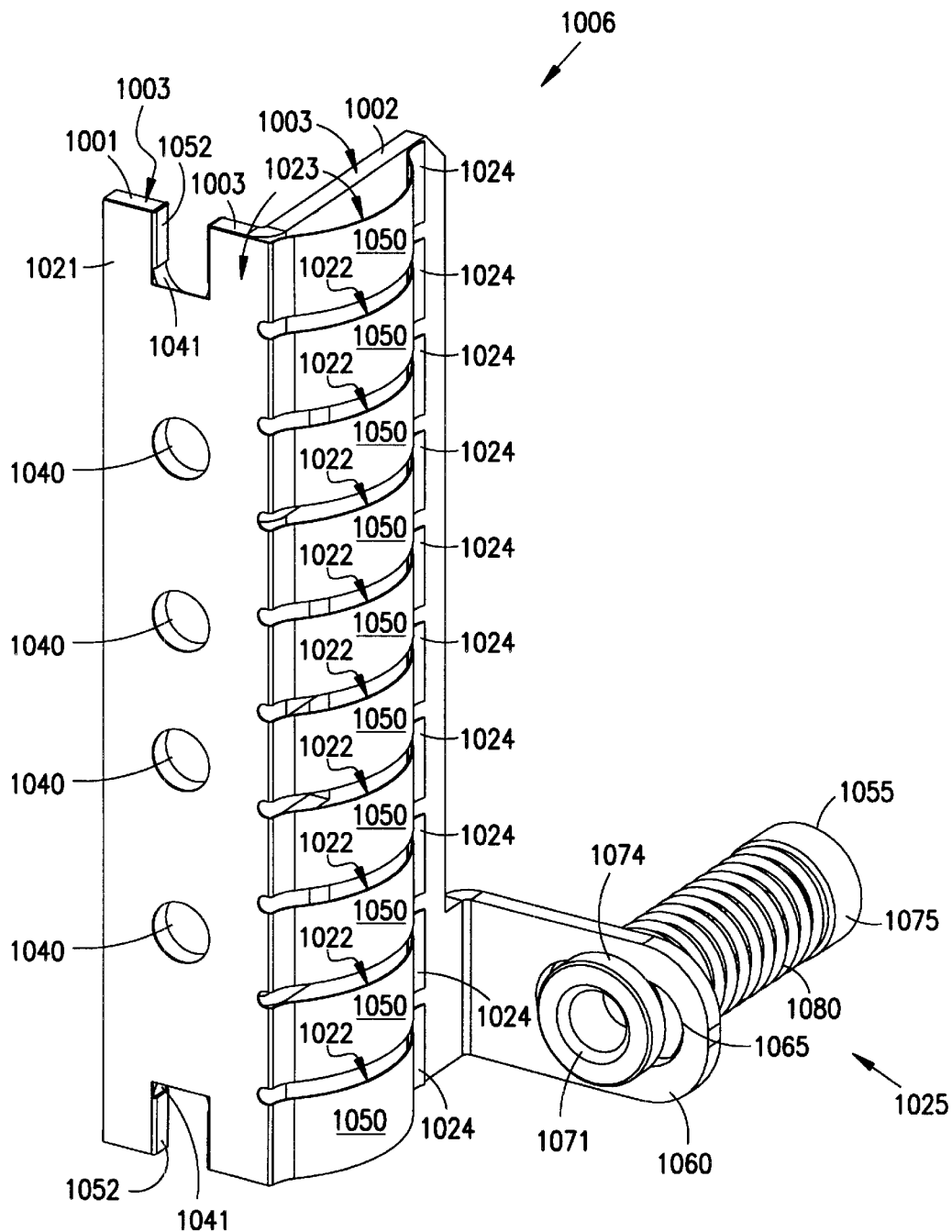
FIG. 1 is a view of one embodiment of a ground bracket.
Figure 2:
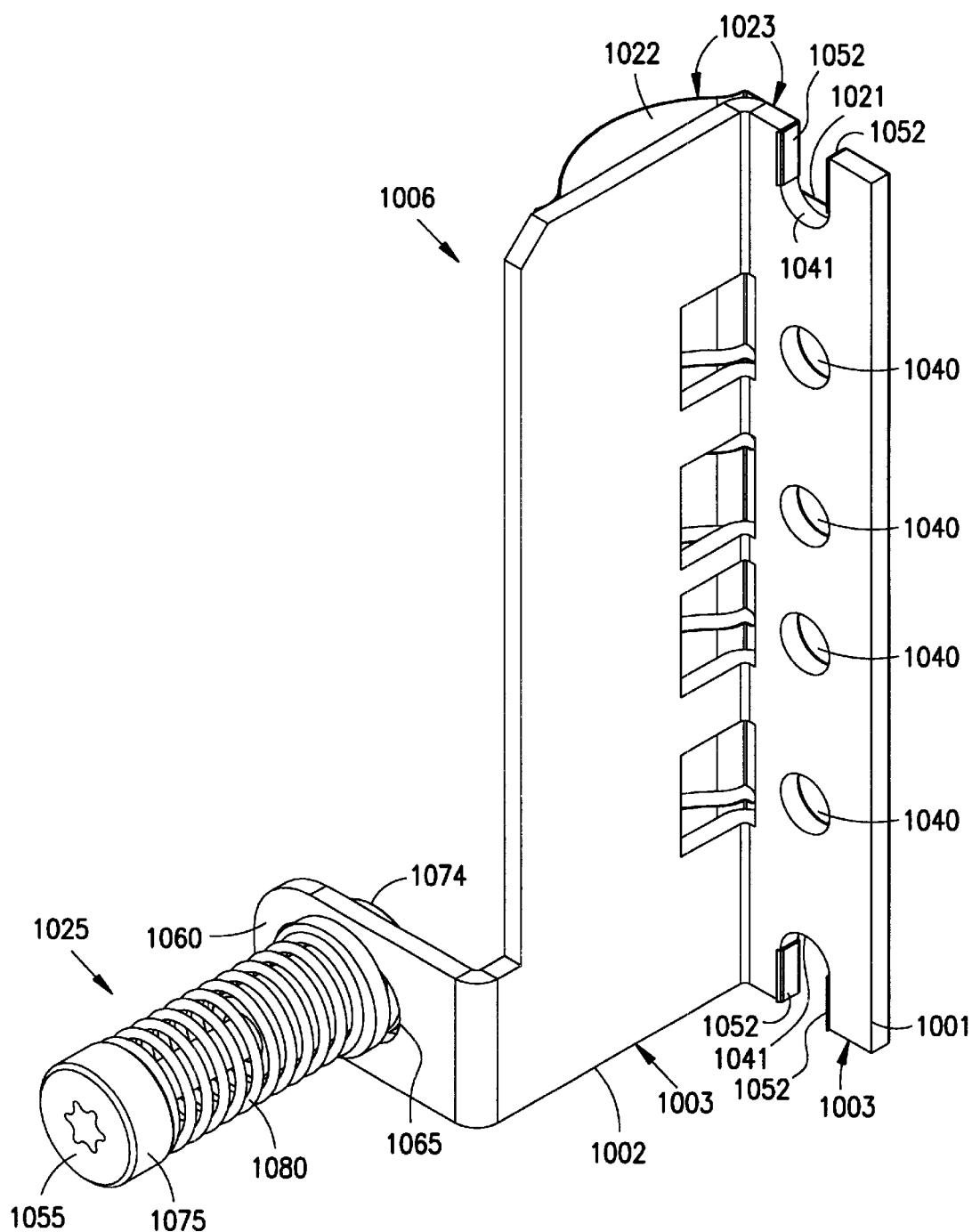
FIG. 2 is a rear view of the ground bracket of FIG. 1.

FIGS. 1 and 2 illustrate an embodiment of a ground bracket 1006 for aligning and grounding a housing of an electronic device to a structure such as a rail, a rack or a cabinet. The ground bracket 1006 provides a path to ground from the electronic device to the structure.

In one embodiment, the ground bracket 1006 includes a rigid portion 1003 including a first wall 1001. The first wall 1001 has at least one aperture 1040 for aligning with an aperture included on the structure and for use in coupling the ground bracket 1006 to the structure. In one embodiment, the bracket 1006 includes at least one threaded aperture for aligning with an aperture on the structure. In one embodiment, the bracket 1006 includes an aperture 1040 for aligning with an industry standard aperture on a computer structure.

In one embodiment, the arcuate shaped portion 1023 is for making direct electrical contact with the electronic device. In another embodiment, the arcuate shaped portion 1023 is for maintaining a spring force for maintaining an area of contact with the electronic device. In another embodiment, the arcuate shaped portion 1023 is comprised of separate tongs 1050. In one embodiment, the arcuate shaped portion 1023 provides a smooth surface that is not damaging to the electronic device. In one embodiment, the arcuate shaped portion 1023 includes a free end 1024 so that it deflects sufficiently upon contact with an electronic device while maintaining a spring force against the electronic device.

In one embodiment, the arcuate shaped portion 1023 precisely positions and aligns the electronic module within the structure.

In one embodiment, the apertures 1040 are precisely machined and located to align with precisely machined and located apertures on the structure. This provides for precise placement of the electronic module within the structure and improved fastener retention.

In one embodiment, the rigid portion 1003 includes a second wall 1002. The second wall 1002 is at about a ninety degree angle from the first wall 1001. In one embodiment, the first wall 1001 and the second wall 1002 are formed from the same piece of conductive material. Although an angle of about ninety degrees is discussed, other angles may be used and are within the scope of the invention.

In one embodiment, the arcuate shaped portion 1023 includes a mounting portion 1021 and an arced portion 1022. The mounting portion 1021 abuts the first wall 1001 of the rigid portion 1003 and is coupled to the first wall 1001 of the rigid portion 1003. The mounting portion 1021 also includes apertures 1040 aligning with the apertures 1040 on the first wall 1001. The arced portion 1022 of the arcuate shaped portion 1023 arcs over the second wall 1002 of the rigid portion 1003 such that it is at about a ninety degree angle from the first wall 1001. In one embodiment, the mounting portion 1021 and the arced portion 1022 are formed from the same piece of conductive material. In one embodiment, the first wall 1001 of the rigid portion 1003 includes slots 1041 for receiving tabs 1052 on the mounting portion 1021. The tabs 1052 engage a portion of the slot 1041 further coupling the arcuate shape portion 1023 to the rigid portion 1003.

Although a bracket having a second wall 1002 at about a ninety degree angle from the first wall 1001 has been discussed, other orientations may be used and are within the scope of the invention. The arcuate shaped portion 1023 may arc over the second wall 1002 of the rigid portion 1003 such that it is at an orientation from the first wall 1001 at an angle other than about ninety degrees.

In one embodiment, the arced portion 1022 of the arcuate shaped portion 1023 is for making direct electrical contact with the electronic device. In another embodiment the arced portion 1022 of the arcuate shaped portion 1023 is for maintaining a spring force for maintaining an area of contact with the electronic device. In another embodiment, the arced portion 1022 of the arcuate shaped portion 1023 is comprised of separate tongs 1050 each having an arced shape 1022. In one embodiment, the arced portion 1022 of the arcuate shaped portion 1023 provides a smooth surface that is not damaging to the electronic device. In one embodiment, the arced portion 1022 includes a free end 1024 so that it deflects sufficiently upon contact with an electronic device while maintaining a spring force against the electronic device. In one embodiment, the arced portion 1022 deflects sufficiently upon contact with an electronic device such that the electronic device may be slid into position within the structure. In one embodiment, the deflection of the arced portion 1022 of the arcuate shaped portion 1023 is limited in one direction by the second wall 1002.

In one embodiment, the arced portion 1022 of the arcuate shaped portion 1023 precisely positions and aligns the electronic module within the structure.

In another embodiment, the bracket 1006 includes a bracket fastener 1025. In one embodiment, the bracket 1006 includes a bracket fastener 1025 for engaging a portion of an electronic device and securing the placement of the electronic device within a structure.

In one embodiment, the bracket fastener 1025 is a rotatable fastener 1055. In one embodiment, the rotatable fastener 1055 is contained within a fastener aperture 1065 on a tab 1060 extending from the bracket 1006. In one embodiment, the tab 1060 is included in the rigid portion 1003 of the bracket 1006 and extends from the second wall 1002.

Figure 3:
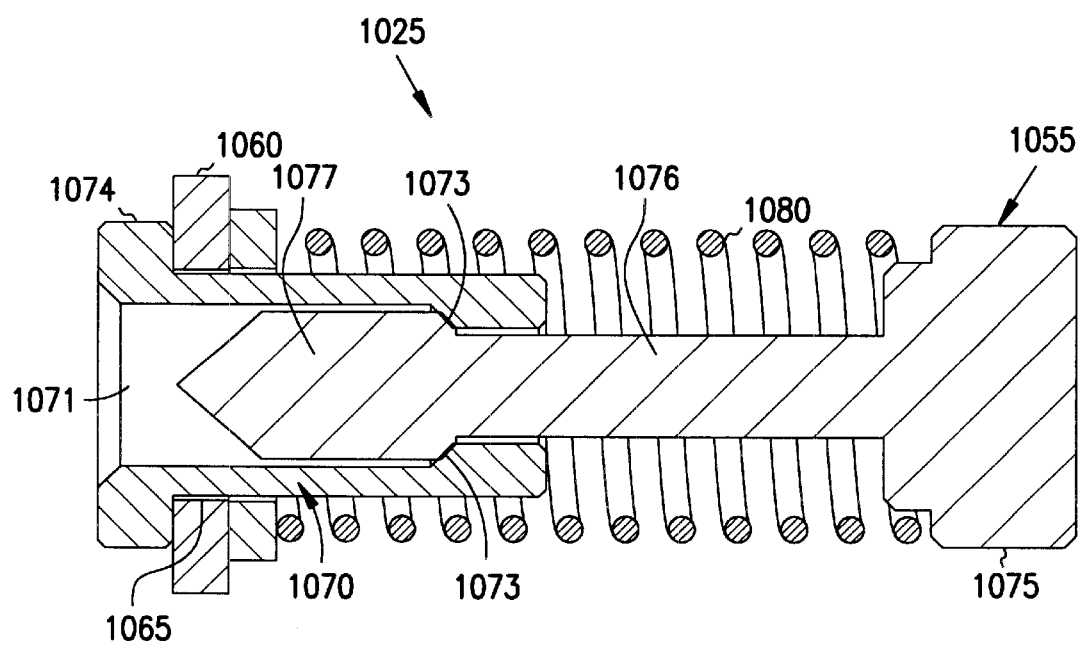
FIG. 3 is a view of one embodiment of a rotatable fastener.

FIG. 3 shows an embodiment of a fastener 1025 including a rotatable fastener assembly 1055. The rotatable fastener assembly 1055 includes a cylinder 1070, a spring 1080 and a threaded fastener 1055. The cylinder 1070 includes an external stop 1074 and an internal stop 1073. The internal stop 1074 is located on the proximal side of the tab to help contain the cylinder within the aperture. The fastener 1055 includes a threaded portion 1077 within the cylinder, the threaded portion is contained within the cylinder in part by the internal stop 1073. The fastener includes a shaft 1076 extending from the threaded portion 1077 outside the cylinder 1070 to a head 1075. The spring extends from the distal side of the tab 1060, over a portion of the cylinder 1070 and to the head 1075. The cylinder 1070 is retained within the aperture 1065 by the external stop 1074 and the spring force between the tab 1060 and the head 1075. The threaded fastener 1055 is retained by the internal stop 1073 against the threaded portion 1077 and the spring force between the tab 1060 and the head 1055. In one embodiment, the fastener aperture 1065 is slotted to allow for repositioning of the fastener 1025 within the slot for improved fastener 1025 alignment with the electronic device. The fastener 1055 is engaged with an electronic device by exerting an axial force and a rotational force on the fastener 1055.

This provides a reliable assembly for use in aligning, grounding and securing a module to a structure. In one embodiment, the tab is formed from the same piece of conductive material as the first wall 1001 and second wall 1002.

In one embodiment, the fastener 1025 is precisely positioned within the aperture 1065 to precisely place the electronic module within the structure.

Figure 4:
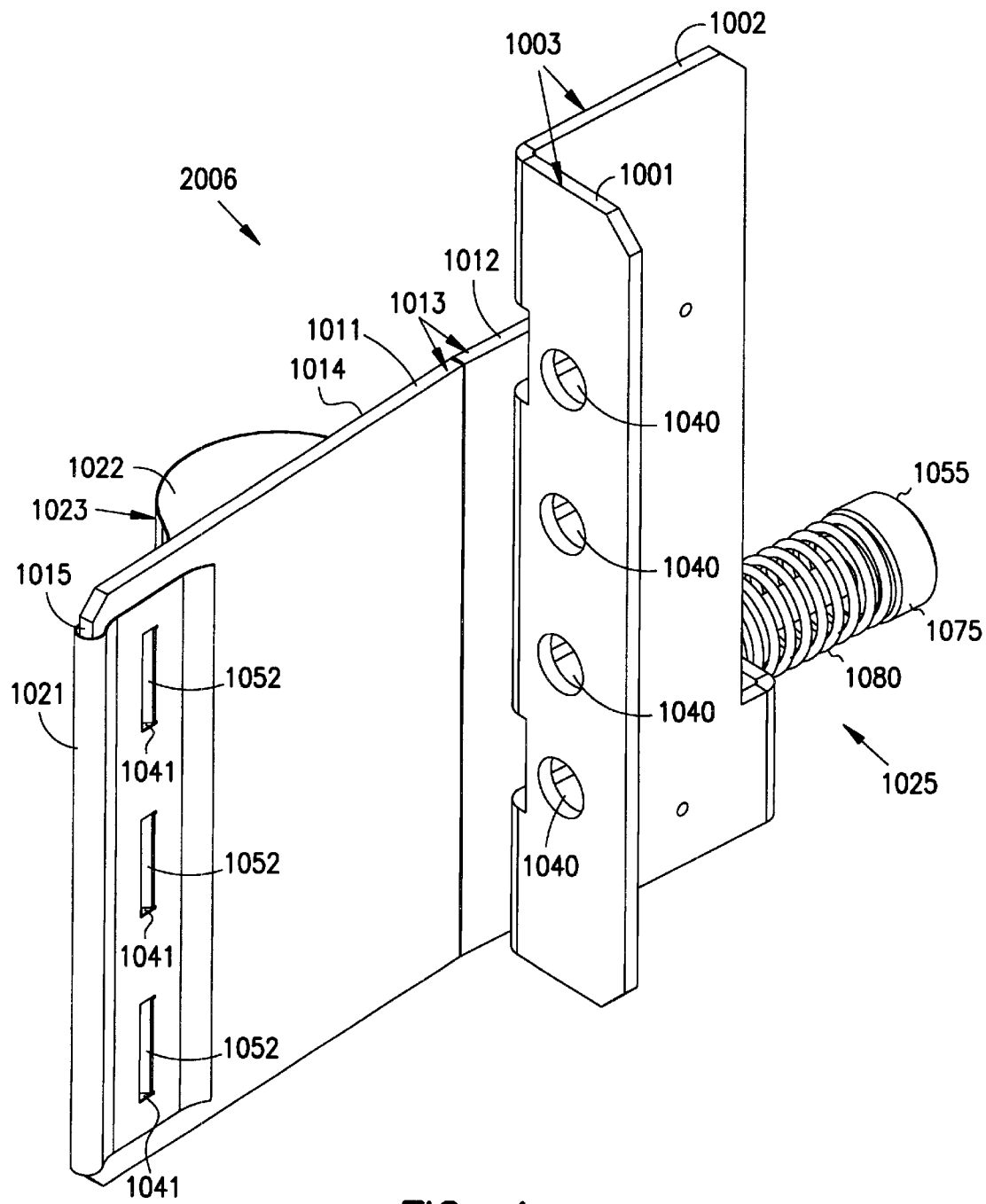
FIG. 4 is a view of one embodiment of a ground bracket.
Figure 5:
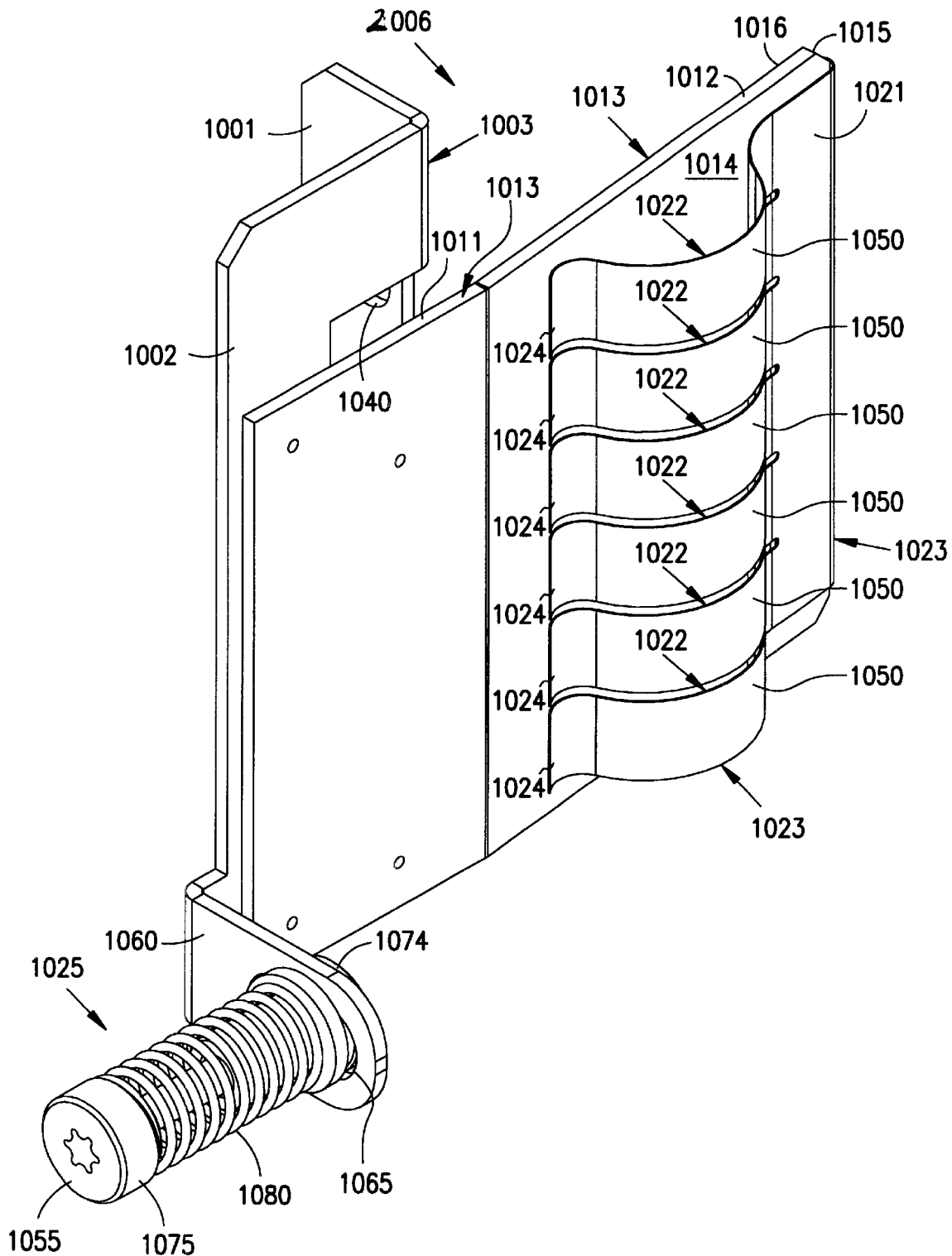
FIG. 5 is a rear view of the ground bracket of FIG. 4.

FIGS. 4 and 5 illustrate an embodiment of a ground bracket 2006 for aligning and grounding a housing of an electronic device to a structure such as a rail, a rack or a cabinet. In one embodiment, the ground bracket 2006 provides a path to ground from an electronic device to a rail which is in turn conductively connected to a computer structure.

In one embodiment, the ground bracket 2006 includes a first rigid portion 1003 and a second rigid portion 1013. The first rigid portion 1003 includes a first wall 1001 and a second wall 1002. In one embodiment, the first wall 1001 has at least one aperture 1040 for aligning with an aperture included on the structure and for use in coupling the ground bracket 2006 to the structure. In one embodiment, the first wall 1001 of the bracket 2006 includes at least one threaded aperture for aligning with an aperture on the structure. In one embodiment, the first wall 1001 of the bracket 2006 includes an aperture 1040 for aligning with an industry standard aperture on a structure. In one embodiment, the second wall 1002 is at about a ninety degree angle from the first wall 1001. In one embodiment, the first wall 1001 and the second wall 1002 are formed from the same piece of conductive material.

In one embodiment, the second rigid portion 1013 includes a second wall 1012 and a first wall 1011. The first wall 1011 of the second rigid portion 1013 abutting the second wall 1002 of the first rigid portion 1003 and coupled to the second wall 1002 of the first rigid portion 1003. In one embodiment, the first wall 1011 of the second rigid portion 1013 is at a slight angle from the second wall 1012 of the second rigid portion.

In one embodiment, the arcuate shaped portion 1023 is mounted onto the second wall 1012 of the second rigid portion 1013. Mounting of the arcuate shaped portion 1023 onto the second wall 1012 of the second rigid portion 1013 which is angled, provides a lead in area to improve the ease with which the electronic device is installed against the bracket 2006.

In one embodiment, the apertures 1040 are precisely machined and located to align, with precisely machined and located apertures on the structure. This provides for precise placement of the electronic module within the structure and improved fastener retention.

In one embodiment, the arcuate shaped portion 1023 includes an arced portion 1022 and a mounting portion 1021. In one embodiment, the mounting portion 1021 abuts a portion of the inner surface 1014 of the second wall 1012, wraps around the end 1015, and abuts a portion of the outer surface 1016 of the second rigid portion 1013. In one embodiment, the second wall 1012 includes slots 1041 and the mounting portion 1021 includes tabs 1052 designed to engage the slots 1041 to further couple the arcuate shaped portion 1023 to the rigid portion 1003 of the bracket 2006.

In one embodiment, the arced portion 1022 of the arcuate shaped portion 1023 extends over the first wall 1001 of the second rigid portion 1013 at about a ninety degree angle from the first wall 1001.

In one embodiment, the arced portion 1022 of the arcuate shaped portion 1023 is for making direct electrical contact with the electronic device. In another embodiment the arced portion 1022 of the arcuate shaped portion 1023 is for maintaining a spring force for maintaining an area of contact with the electronic device. In another embodiment, the arced portion of the arcuate shaped portion 1023 is comprised of separate tongs each having an arced shape 1022. In one embodiment, the arcuate shaped portion 1023 provides a smooth surface that is not damaging to the electronic device. In one embodiment, the arced portion 1022 includes a free end 1024 so that it deflects sufficiently upon contact with an electronic device while maintaining a spring force against the electronic device. In one embodiment, the arced portion 1022 deflects sufficiently upon contact with an electronic device such that the electronic device may be slid into position within the structure. In one embodiment, the deflection of the arced portion 1022 is limited in one direction by the second wall 1002.

In one embodiment, the arced portion 1022 of the arcuate shaped portion 1023 precisely positions and aligns the electronic module within the structure.

In another embodiment, the bracket 2006 includes a bracket fastener 1025. In one embodiment, the bracket 2006 includes a bracket fastener 1025 for engaging a portion of an electronic device and for securing the placement of the electronic device within a structure.

Figure 6:
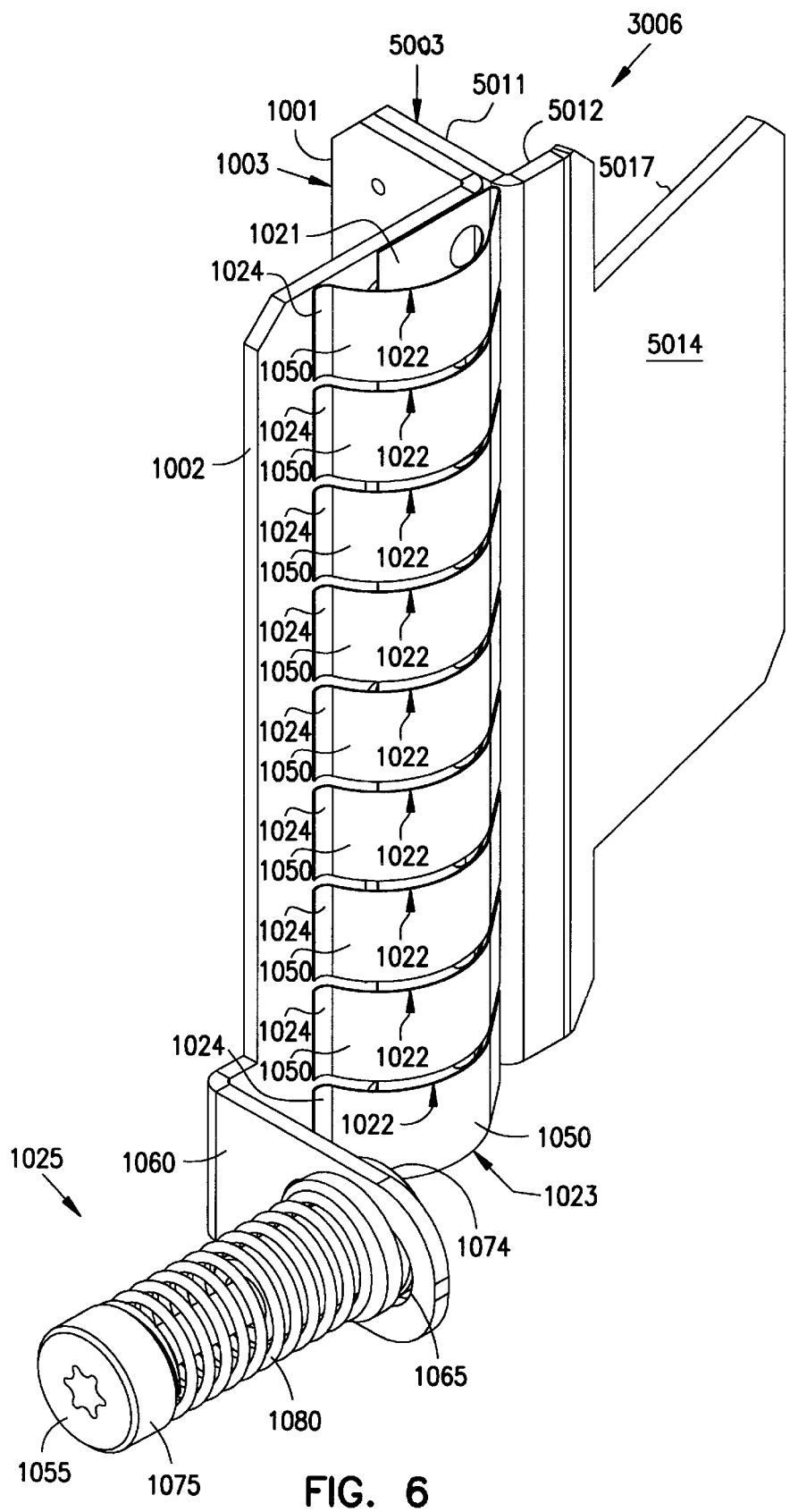
FIG. 6 is a view of one embodiment of a ground bracket.

FIG. 6 illustrates an embodiment of a ground bracket 3006 for aligning and grounding a housing of an electronic device to a structure such as a rail, a rack or a cabinet. In one embodiment, the ground bracket 3006 provides a path to ground from an electronic device to a rail which is in turn conductively connected to a computer structure.

In one embodiment, the ground bracket 3006 includes a first rigid portion 1003 and a second rigid portion 5003.

The first rigid portion 1003 includes a first wall 1001 and a second wall 1002. In Gone embodiment, the second wall 1002 is at about a ninety degree angle from the first wall 1001. In one embodiment, the first wall 1001 and second wall 1002 are formed from the same piece of conductive material.

The second rigid portion 5003 includes a first wall 5011 and a second wall 5012. In one embodiment, the second wall 5012 is at about a ninety degree angle from the first wall 1001. In one embodiment, the first wall 5011 and the second wall 5012 are formed from the same piece of conductive material.

The first wall 1001 of the first rigid portion 1003 and the first wall 5011 of the second rigid portion 5003 abut one another. The second wall 1002 of the first rigid portion 1003 and the second wall 5012 of the second rigid portion 5003 form an essentially continuous face. The second wall 5012 includes an inner surface 5014.

An arcuate shaped portion 1023 is mounted onto the first wall 1001 of the first rigid portion 1003. The arcuate shaped portion 1023 includes an arced portion 1022 and a mounting portion 1021. The mounting portion 1021 is coupled flat against the first wall 1001. The arced contact portion 1022 extends from the mounting portion 1021 and wraps over the mounting portion 1021 in an arced shape. The arced contact portion 1022 includes a free end 1024 so that it deflect sufficiently upon contact with an electronic device while maintaining a spring force against the electronic device.

In one embodiment, the first wall 1001 of the first rigid structure 1003 includes at least one slot 1041. The mounting portion 1021 includes tabs which are received within the slot 1041 and couple with the slot 1041 by wrapping around the edge of a portion of the slot 1041.

In one embodiment, the second wall 5012 includes an angled lead in section 5017 adapted to guide an electronic device into the arced contact portion 1022 of the arcuate shaped portion 1023. A device contacts inner surface 5014 on the angled lead in section 5017 and is guided into the arced contact portion 1022.

In one embodiment, the first wall 1001 of the first rigid portion 1003 and the first wall 5011 of the second rigid portion 5003 each have at least one aligned aperture 1040 for aligning with an aperture included on the structure and for use in coupling the ground bracket 3006 to the structure. In one embodiment, the first wall 1001 of the first rigid portion 1003 and the first wall 5011 of the second rigid portion 5003 each include at least one aligned and threaded aperture for aligning with an aperture on the structure. In one embodiment, the first wall 1001 of the first rigid portion 1003 and the first wall 5011 of the second rigid portion 5003 each include at least one aligned aperture 1040 for aligning with an industry standard aperture on a structure.

In one embodiment, the arced portion 1022 of the arcuate shaped portion 1023 is for making direct electrical contact with the electronic device. In another embodiment the arced portion 1022 of the arcuate shaped portion 1023 is for maintaining a spring force for maintaining an area of contact with the electronic device. In another embodiment, the arced portion of the arcuate shaped portion 1023 is comprised of separate tongs each having an arced shape 1022. In one embodiment, the arcuate shaped portion 1023 provides a smooth surface that is not damaging to the electronic device. In one embodiment, the arced portion 1022 includes a free end 1024 so that it deflects sufficiently upon contact with an electronic device while maintaining a spring force against the electronic device. In one embodiment, the arced portion 1022 deflects sufficiently upon contact with an electronic device such that the electronic device may be slid into position within the structure. In one embodiment, the deflection of the arced portion 1022 is limited in one direction by the second wall 1002.

In one embodiment, the arced portion 1022 of the arcuate shaped portion 1023 precisely positions and aligns the electronic module within the structure.

In another embodiment, the bracket 3006 includes a bracket fastener 1025 for engaging the electronic module that is grounded by the bracket 3006. In one embodiment, the bracket 3006 includes a bracket fastener 1025 for engaging a portion of an electronic device and for securing the placement of the electronic device within a structure. In one embodiment, the bracket 3006 includes a tab extending from the second wall. The tab includes an aperture and the fastener is contained within the aperture. In one embodiment, the aperture is slotted to allow the fastener to be aligned with a portion of an electronic module.

In one embodiment, the ground bracket 1006, 2006, 3006 can be mounted at a position on a rail such that a fastener inserted through an aperture 1040 in the ground bracket, passes through an aperture in the rail and engages a portion of a shelf positioned to support an electronic device. An example of such a rail is described in U.S. application Ser. No. 09/408148 Computer Module Mounting System and Method. An example of such a rail and support is described in U.S. application Schwegman, Lundberg, Woessner and Kluth docket number 00499.047US1, Device Support. In one embodiment, a support and ground bracket 1006, 2006, 3006 are fastened to a rail, an electronic device is slid onto the rail and positioned by the arcuate portion 1022 of the ground bracket 1006, 2006, 3006. A fastener 1025 included on the ground bracket 1006, 2006, 3006 is then engaged with a portion of the electronic device securing the position of the electronic device.

An advantage of the ground bracket 1006, 2006, 3006 is the ability to eliminate grounding of electronic devices external to the structure. This can provide for the ability to ground the electronic device in the absence of a sub-floor ground grid. For example, a structure can be used to provide a computer system having substantially all cable connections above the surface that the structure rests on. Another advantage is an improved, more direct path from the electronic device to ground. In one embodiment, a cable is connected to the electronic device and the ground bracket 1006, 2006, 3006 is located proximal to the cable connection. In another embodiment, the position of the electronic device within the structure is adjustable and the position of the ground bracket 1006, 2006, 3006 can also be adjusted to provide a direct path to ground for all adjustable positions of the electronic device. Thus use of a separate ground bracket 1006, 2006, 3006 coupled to a structure such as a rail, rack or cabinet can provide a versatile solution to grounding of an electronic device.

In one embodiment, the ground bracket 1006, 2006, 3006 also secures precise placement of the electronic device within the structure. Precise placement of electronic devices within the structure with the precision methods described allows for optimization of electronic device dimensions. Electronic devices can be designed to have maximum height, width, and depth in order to satisfy industry standards while providing the maximum amount of space internally to the electronic device and also maximizing electronic device content within the structure. The features providing for automatic alignment and placement of components improves installation, serviceability, upgrade and scalability in an environment traditionally unfavorable to these needs. This provides for improved ability to provide larger electronic systems.

The present invention can be applied to commercial use electronics. The present invention can also be applied to personal use electronics. Among other things, the present invention can be used to improve the ease with which such systems are scaled, installed, serviced and upgraded.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A bracket for providing an electrical path from an electronic device to a structure comprising:

a first wall adapted for coupling to a structure;

an arcuate shaped portion conductively coupled to the first wall, the arcuate shaped portion adapted for contacting an electronic device;

the bracket capable of providing an electrical path from the electronic device to the structure;

a tab extending from the first wall and having an elongated, slotted aperture; and a fastener assembly positioned within the aperture for engaging a portion of the electronic device, wherein the fastener assembly is repositionable along the elongated, slotted aperture to align the fastener with the electronic device.

2. The bracket of claim 1, further comprising a second wall extending at about a ninety degree angle from the first wall and the arcuate shaped portion including:

a mounting portion coupled to the first conductive wall; and an arced contact portion extending from the mounting portion over the second wall.

3. The bracket of claim 2, wherein the first wall portion includes at least one aperture and the mounting portion includes at least one aperture aligned with the aperture on the first wall, the aperture on the first wall and on the mounting portion adapted to align with an aperture on a structure.

4. The bracket of claim 3, wherein the aperture on the first wall and the aperture on the mounting portion are threaded, the threaded apertures adapted to receive a fastener extending through an aperture in a rail conductively coupled to a structure.

5. The bracket of claim 2, wherein the second wall limits the deflection of the arced portion in at least one direction.

6. The bracket of claim 2, wherein the arced contact portion is comprised of separate tongs.

7. The bracket of claim 2, further comprising:

a tab extension extending from the second wall and adapted to be proximal an installed electronic device, the tab extension including an aperture;

a fastener contained within the aperture, the fastener adapted to engage a portion of the electronic device.

8. The bracket of claim 7, further comprising:

the tab extension having:
 a proximal side; and
 a distal side;

the fastener comprising a fastener assembly having:
 a cylinder positioned within the aperture having:
  an external stop on the proximal side of the tab extension; and
  an internal stop;
 a threaded fastener having:
  a threaded portion within the cylinder having an interface with the internal stop;
  a shaft extending from the threaded portion and extending outside the cylinder; and
  a head on the distal side of the tab; and
 a spring extending from the distal side of the tab over the cylinder and over the shaft to the head;

wherein the cylinder is retained within the aperture by the external stop and the spring force between the tab and the head and wherein the threaded fastener is retained by the internal stop and the spring force between the tab and the head.

9. The bracket of claim 1, further comprising a second wall extending from the first wall at about a ninety degree angle, the first and second wall comprising a first rigid portion;

a second rigid portion coupled to the second wall, the second rigid portion having an inner surface; and the arcuate shaped portion coupled to the second rigid portion.

10. The bracket of claim 9, wherein the first wall portion includes at least one aperture adapted to align with an aperture on a structure.

11. The bracket of claim 10, wherein the aperture is threaded.

12. The bracket of claim 9, further comprising:
a tab extension extending from the second wall and adapted to be proximal an installed electronic device, the tab extension including an aperture; and
a fastener contained within the aperture, the fastener adapted to engage a portion of the electronic device.

13. The bracket of claim 12, further comprising:
the tab extension having:
a proximal side; and
a distal side; the fastener comprising a fastener assembly having:
a cylinder positioned within the aperture having:
an external stop on the proximal side of the tab extension; and
an internal stop;
a threaded fastener having:
a threaded portion within the cylinder having an interface with the internal stop;
a shaft extending from the threaded portion and extending outside the cylinder; and
a head on the distal side of the tab; and
a spring extending from the distal side of the tab over the cylinder and over the shaft to the head;
wherein the cylinder is retained within the aperture by the external stop and the spring force between the tab and the head and wherein the threaded fastener is retained by the internal stop and the spring force between the tab and the head.

14. The bracket of claim 9, the second rigid portion further comprising:
a first inner wall having an inner surface, the first inner wall coupled to the second wall of the first rigid portion;
a second inner wall having an inner surface and extending from the first inner wall, the first inner wall and second inner wall of the second rigid portion forming the inner wall; and
the arcuate shaped portion including:
a mounting portion coupled to the second inner wall of the second rigid portion; and
an arced contact portion extending from the mounting portion over the inner surface of the second inner wall.

15. The bracket of claim 14, wherein the second inner wall is angled, the angled second inner wall and arcuate shaped portion are adapted to guide an electronic module it as it is placed into contact with the arced contact portion.

16. The bracket of claim 14, wherein the second inner wall limits the deflection of the arced portion in at least one direction.

17. The bracket of claim 16, wherein the arced contact portion is comprised of separate tongs.

18. The bracket of claim 1, further comprising:
a second wall extending from the first wall at about a ninety degree angle, the first and second wall defining a first rigid portion; and
the arcuate shaped portion coupled to the second wall.

19. The bracket of claim 18, further comprising:
a second rigid portion having:
a second rigid portion first wall coupled to the first rigid portion first wall; and
a second rigid portion second wall extending from the second rigid portion first wall at about a ninety degree angle, the first rigid portion second wall and the second rigid portion second wall each having an inner surface; and
the arcuate shaped portion including:
a mounting portion coupled to the inner surface of the first rigid portion second wall; and
an arced contact portion arcing over the mounting portion.

20. The bracket of claim 19, wherein the second rigid portion second wall is angled, the inner surface of the angled second rigid portion second wall adapted to guide an electronic module as it is placed into contact with the arced contact portion on the first rigid portion second wall.

21. The bracket of claim 19, wherein the first rigid portion first wall includes at least one aperture and the second rigid portion first wall includes at least one aperture aligned with the aperture on the first rigid portion first wall, the aperture on the first rigid portion first wall and on the second rigid portion first wall adapted to align with an aperture on a structure.

22. The bracket of claim 21, wherein the aperture on the first rigid portion first wall and the aperture on the second rigid portion first wall are threaded, the threaded apertures adapted to receive a fastener extending through an aperture in the structure.

23. The bracket of claim 19, wherein the second rigid portion second wall limits the deflection of the arced portion in at least one direction.

24. The bracket of claim 19, wherein the arced contact portion is comprised of separate tongs.

25. The bracket of claim 1, wherein the arcuate shaped portion maintains a spring force against the electronic device.

26. The bracket of claim 1, wherein the bracket secures placement of the electronic device within the structure.

27. The bracket of claim 1, wherein the bracket precisely positions the electronic device in the structure.

28. The bracket of claim 1, wherein the first wall includes a portion having at least one aperture for use in coupling the bracket to the structure.

29. The bracket of claim 28, wherein the bracket includes at least one threaded aperture for use in coupling the bracket to the structure.

30. The bracket of claim 28, wherein the aperture is precisely machined to correspond to a portion of the structure having an aperture.

31. The bracket of claim 28, wherein the first conductive wall includes an aperture for aligning with an aperture on a rail portion of the structure, the bracket adapted for coupling to the rail, the bracket electrically coupled to the structure through the rail.

32. The bracket of claim 1, wherein the arcuate portion includes separate tongs having each having an arced shape.

33. A bracket for providing an electrical path from an electronic device to a structure comprising:
a first wall adapted for coupling to a structure;
an arcuate shaped portion conductively coupled to the first wall, the arcuate shaped portion adapted for contacting an electronic device, wherein the bracket is capable of providing an electrical path from the electronic device to the structure;
a tab extension conductively coupled to the first wall, the tab extension including an aperture; and a fastener contained within the aperture, the fastener adapted to engage a portion of an electronic device;
the tab extension having:
 a proximal side; and
 a distal side;
the fastener comprising a fastener assembly having:
 a cylinder positioned within the aperture having:
  an external stop on the proximal side of the tab extension; and
  an internal stop;
 a threaded fastener having:
  a threaded portion within the cylinder having an interface with the internal stop;
  a shaft extending from the threaded portion and extending outside the cylinder; and
  a head on the distal side of the tab; and
 a spring extending from the distal side of the tab over the cylinder and over the shaft to the head;
wherein the cylinder is retained within the aperture by the external stop and the spring force between the tab and the head and wherein the threaded fastener is retained by the internal stop and the spring force between the tab and the head.

34. A bracket for providing an electrical path from an electronic device to a structure comprising:
a first wall adapted for coupling to a structure;
an arcuate shaped portion conductively coupled to the first wall, the arcuate shaped portion adapted for contacting an electronic device, wherein the bracket is capable of providing an electrical path from the electronic device to the structure;
a second wall extending from the first wall at about a ninety degree angle, the first and second wall defining a first rigid portion;
the arcuate shaped portion coupled to the second wall;
a second rigid portion having:
 a second rigid portion first wall coupled to the first rigid portion first wall; and
 a second rigid portion second wall extending from the second rigid portion first wall at about a ninety degree angle, the first rigid portion second wall and the second rigid portion second wall each having an inner surface; and
the arcuate shaped portion including:
 a mounting portion coupled to the inner surface of the first rigid portion second wall; and
 an arced contact portion arcing over the mounting portion;
a tab extension extending from the second wall and adapted to be proximal an installed electronic device, the tab extension including an aperture; and
a fastener contained within the aperture, the fastener adapted to engage a portion of the electronic device;
the tab extension having:
 a proximal side; and
 a distal side;
the fastener comprising a fastener assembly having:
 a cylinder positioned within the aperture having:
  an external stop on the proximal side of the tab extension; and
  an internal stop;
 a threaded fastener having:
  a threaded portion within the cylinder having an interface with the internal stop;
  a shaft extending from the threaded portion and extending outside the cylinder; and
  a head on the distal side of the tab; and
 a spring extending from the distal side of the tab over the cylinder and over the shaft to the head;
wherein the cylinder is retained within the aperture by the external stop and the spring force between the tab and the head and wherein the threaded fastener is retained by the internal stop and the spring force between the tab and the head.

35. A bracket comprising:
a first wall adapted for coupling to a structure; and
a tab extending from the first wall and having a portion including an elongated, slotted aperture, the tab adapted to be positioned proximal an electronic device;
a rotatable fastening mechanism contained within the aperture and adapted for coupling to the electronic device, wherein the rotatable fastening mechanism is repositionable along the elongated, slotted aperture to align the fastener with the electronic device.

36. A bracket comprising:
a first wall adapted for coupling to a structure; and
a tab having a portion including an aperture, the tab adapted to be positioned proximal an electronic device;
a rotatable fastening mechanism contained within the aperture adapated for coupling to the electronic device;
a tab extension conductively coupled to the first conductive wall, the tab extension including an aperture; and
a fastener contained within the aperture, the fastener adapted to engage a portion of an electronic device;
the tab extension having:
 a proximal side; and
 a distal side;
the fastener comprising a fastener assembly having:
 a cylinder positioned within the aperture having:
  an external stop on the proximal side of the tab extension; and
  an internal stop;
 a threaded fastener having:
  a threaded portion within the cylinder having an interface with the internal stop;
  a shaft extending from the threaded portion and extending outside the cylinder; and
  a head on the distal side of the tab; and
 a spring extending from the distal side of the tab over the cylinder and
 over the shaft to the head;
wherein the cylinder is retained within the aperture by the external stop and the spring force between the tab and the head and wherein the threaded fastener is retained by the internal stop and the spring force between the tab and the head.

37. The bracket of claim 36, wherein the fastener aperture is slotted and adapted to allow for repositioning of the fastener within the slot for improved fastener alignment with the electronic device.

38. A method for placement and grounding of an electronic device comprising:
coupling a conductive bracket to a structure including:
providing a bracket having a first wall and an arcuate shaped portion electrically coupled a to the first wall and a tab extending from the first wall and having an elongated, slotted aperture;
coupling the first conductive wall to the structure; and
installing the electronic device in the structure such that the electronic device contacts the arcuate shaped portion of the conductive bracket by using a fastener assembly positioned within the aperture for engaging a portion of the electronic device, wherein the fastener assembly is repositionable along the elongated, slotted aperture to align the fastener with the electronic device.

39. A method of assembling a rack of electronic devices, comprising:

installing a plurality of rails within the rack;

attaching a grounding bracket to at least one of the plurality of rails, wherein each grounding bracket includes a portion for contacting the rail and an arcuate shaped portion including an arced contact portion for contacting an electronic device;

installing one or more electronic devices such that the electronic device contacts the arced contact portion of the conductive bracket, the ground bracket and rail provide a path to ground from the electronic device to the rack; and coupling a fastener to a portion of the electronic device, the fastener contained within an elongated, slotted aperture portion of the bracket, wherein coupling the fastener includes positioning the fastener within the slotted aperture portion of the bracket to align the fastener with a portion of an electronic device and applying an axial and rotational force to the fastener to engage the fastener with the electronic device.

40. The method of claim 39, further comprising:

the aperture portion is included on a tab, the tab having a proximal side and a distal side; and providing a fastener comprising providing a fastener assembly including:
 a cylinder positioned within the aperture having:
  an external stop on the proximal side of the tab extension; and
  an internal stop;
 a threaded fastener having:
  a threaded portion within the cylinder having an interface with the internal stop;
  a shaft extending from the threaded portion and extending outside the cylinder; and
 a head on the distal side of the tab; and
 a spring extending from the distal side of the tab over the cylinder and over the
 shaft to the head;
wherein the cylinder is retained within the aperture by the external stop and the spring force between the tab and the head and wherein the threaded fastener is retained by the internal stop and the spring force between the tab and the head.

* * * * *

UNITED STATES PATENT AND TRADEMARK OFFICE
CERTIFICATE OF CORRECTION

PATENT NO. : 6,574,121 B1  
DATED : June 3, 2003  
INVENTOR(S) : Perry D. Franz and Jeffrey M. Glanzman It is certified that error appears in the above-identified patent and that said Letters Patent is hereby corrected as shown below:

Column 12,
Line 61, delete "a" after "coupled".

Signed and Sealed this

Twenty-fifth Day of November, 2003

JAMES E. ROGAN
*Director of the United States Patent and Trademark Office*